United States Patent
Biel et al.

(10) Patent No.: US 8,580,163 B2
(45) Date of Patent: Nov. 12, 2013

(54) PROCESS FOR MANUFACTURING AN OPHTHALMIC LENS

(75) Inventors: Roger Biel, Aschaffenburg (DE);
Gabriela Cocora, Elsenfeld-Eichelsbach (DE); Peter Hagmann, Erlenbach am Main (DE); Uwe Haken, Norcross, GA (US); Jordan Hall, Atlanta, GA (US); Axel Heinrich, Aschaffenburg (DE); Günter Lässig, Obernburg (DE); Honghui Lu, Johns Creek, GA (US); Deborah J. Mulcahy, Suwanee, GA (US); Carlton Pope, Lithonia, GA (US); Daryl Reece, Atlanta, GA (US); Bernhard Seiferling, Goldbach (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 12/904,209

(22) Filed: Oct. 14, 2010

(65) Prior Publication Data
US 2011/0089586 A1    Apr. 21, 2011

Related U.S. Application Data

(60) Provisional application No. 61/252,370, filed on Oct. 16, 2009.

(51) Int. Cl.
*B29D 11/00* (2006.01)
(52) U.S. Cl.
USPC ......................................................... 264/1.32
(58) Field of Classification Search
USPC ......................................................... 264/1.32
See application file for complete search history.

(56) References Cited

U.S. PATENT DOCUMENTS

| | | | |
|---|---|---|---|
| 2,333,051 A | | 10/1943 | Smith |
| 4,121,896 A | * | 10/1978 | Shepherd ...................... 425/412 |
| 4,197,266 A | | 4/1980 | Clark |

(Continued)

FOREIGN PATENT DOCUMENTS

| | | |
|---|---|---|
| EP | 0367513 A2 | 5/1990 |
| EP | 0484015 A2 | 5/1992 |

(Continued)

OTHER PUBLICATIONS

Fogleman et al. ("Laser interferometric method for measuring linear polymerization shrinkage in light cured dental restoratives." Dental Materials 18, 324-330 (2002).*

(Continued)

*Primary Examiner* — Larry Thrower
(74) *Attorney, Agent, or Firm* — Robert Ambrose

(57) ABSTRACT

There is described a process for manufacturing an ophthalmic lens and an apparatus for forming an ophthalmic lens, in particular a silicone hydrogel contact lens, wherein in a mold assembly a first and a second mold half (101, 102) are first arranged in an intermediate closed position in which the mold surfaces of the two mold halves are spaced apart from each other at a distance increase (d1) of preferably 1 to 100 μm relative to a final distance (d0) in a final closed position, and wherein, during curing of the lens forming material (202), the mold surfaces (105, 106) of the mold halves (101, 102) are actively or passively moved or moving from the intermediate closed position to the final closed position, where the distance increase (d1) is 0.

6 Claims, 12 Drawing Sheets

(56) References Cited

U.S. PATENT DOCUMENTS

| | | | |
|---|---|---|---|
| 4,284,591 A | 8/1981 | Neefe | |
| 4,955,580 A | 9/1990 | Seden | |
| 5,015,426 A | 5/1991 | Maus | |
| 5,036,971 A | 8/1991 | Seden | |
| 5,110,514 A | 5/1992 | Soane | |
| 5,114,632 A | 5/1992 | Soane | |
| 5,143,660 A | 9/1992 | Hamilton | |
| 5,269,867 A | 12/1993 | Arai | |
| 5,278,243 A | 1/1994 | Soane | |
| 5,415,817 A * | 5/1995 | Shiao et al. | 264/2.2 |
| 5,540,410 A | 7/1996 | Lust | |
| 5,573,108 A | 11/1996 | Hamilton | |
| 5,578,332 A | 11/1996 | Hamilton | |
| 5,894,002 A | 4/1999 | Boneberger | |
| 6,234,629 B1 | 5/2001 | Neadle | |
| 6,260,387 B1 | 7/2001 | Richards | |
| 6,627,124 B1 | 9/2003 | Herbrechtsmeier | |
| 7,117,790 B2 | 10/2006 | Kendale | |
| 7,320,587 B2 | 1/2008 | Goodenough | |
| 7,581,943 B2 | 9/2009 | Goodenough | |
| 7,583,389 B2 | 9/2009 | Neal | |
| 7,616,330 B2 | 11/2009 | Neal | |
| 7,623,251 B2 | 11/2009 | Neal | |
| 7,665,983 B2 | 2/2010 | Kendale | |
| 7,727,453 B2 | 6/2010 | Sreenivasan | |
| 7,780,881 B2 | 8/2010 | Goodenough | |
| 2003/0115907 A1 | 6/2003 | Patton | |
| 2003/0213382 A1 | 11/2003 | Kendale | |
| 2005/0011227 A1 | 1/2005 | Sakai | |
| 2006/0076717 A1 | 4/2006 | Sreenivasan | |
| 2007/0002331 A1 | 1/2007 | Hall | |
| 2007/0036878 A1 | 2/2007 | Goodenough | |
| 2007/0236701 A1 | 10/2007 | Neal | |
| 2007/0236702 A1 | 10/2007 | Neal | |
| 2007/0236703 A1 | 10/2007 | Neal | |
| 2007/0261574 A1 | 11/2007 | Kendale | |
| 2007/0292555 A1 | 12/2007 | Goodenough | |
| 2008/0099941 A1 | 5/2008 | Suehira | |
| 2009/0102078 A1 | 4/2009 | Goodenough | |
| 2009/0160073 A1 | 6/2009 | Tollefson | |
| 2009/0262333 A1 | 10/2009 | Hall | |
| 2009/0283938 A1 | 11/2009 | Suehira | |

FOREIGN PATENT DOCUMENTS

| | | |
|---|---|---|
| EP | 1014155 A1 | 6/2000 |
| JP | 59073910 A | 4/1984 |
| WO | 8704390 A1 | 7/1987 |
| WO | 9013413 A1 | 11/1990 |
| WO | 9920455 A2 | 4/1999 |

OTHER PUBLICATIONS

PCT International Search Report dated Jan. 19, 2011, International Application No. PCT/EP2010/065475, International Filing Date Oct. 14, 2010.

PCT Written Opinion of the International Searching Authority dated Jan. 19, 2011, International Application No. PCT/EP2010/065475, International Filing Date Oct. 14, 2010.

* cited by examiner

PROCESS FOR MANUFACTURING AN OPHTHALMIC LENS

This application claims the benefit under 35 U.S.C. §119 (e) of U.S. provisional application Ser. No. 61/252,370, filed on Oct. 16, 2009, incorporated herein by reference in its entirety.

FIELD

The present invention relates to a process for manufacturing an ophthalmic lens. The present invention also relates to an apparatus for carrying out the above process.

BACKGROUND OF THE INVENTION

Ophthalmic lenses, in particular contact lenses, which it is intended to produce economically in large numbers, are preferably produced by the so-called mold or full-mold process. In this process, the lenses are produced in their final shape between two mold halves, so that neither subsequent machining of the surfaces of the lenses nor machining of the edge is necessary. Such molding processes are described in more detail, for example in WO-A-87/04390, EP-A-0367513 or in U.S. Pat. No. 5,894,002.

In the known molding processes, the geometry of the ophthalmic lens to be produced is defined by the mold cavity between the two lens forming surfaces of the mold halves. The edge of the ophthalmic lens is likewise formed within the mold, whereby the geometry of the edge may be defined by a spatial limitation of the UV light used for cross-linking a lens forming material.

In order to produce an ophthalmic lens, such as a contact lens, usually a specific amount of a flowable lens forming material is introduced into the female or concave mold half in a first step. The mold is then closed by putting the male or convex mold half into place. The subsequent polymerization and/or cross-linking of the lens forming material is carried out by means of irradiation with UV light and/or by heating. In the process, either both, the lens forming material in the mold cavity and the excess material in an overflow region or area are crosslinked or hardened, or only the lens forming material in the mold cavity is hardened, whereas the excess material in the overflow region remains as "flash". In order to obtain fault-free separation of the lens from the excess material, good sealing or expulsion of the excess material must be achieved in the zone in which the two mold halves make contact with each other or in that zone, which defines the spatial limitation of the UV light used for cross-linking the lens forming material.

After the lens has been formed, the mold is disassembled and the lens removed. Additional processing steps, such as inspection, extraction, hydration, surface treatment and sterilization may finally be performed on the lens before packaging.

Upon polymerization and/or cross-linking of the lens forming material, shrinkage may occur, which may lead to stress in the final lens and/or may result in an uneven lens surface which may be referred to as having so-called "grooves" or "road maps". The problem of shrinkage upon curing (i.e. polymerization and/or cross-linking) of lens forming material is known in the art and has been addressed with different technical solutions, such as the following:

EP-A-1014 155 discloses a method of manufacturing a contact lens having areas of different thickness, wherein the contact lens design is compensating differential shrinkage during the manufacturing process. The contact lens design is providing an equal but opposite power to compensate for unwanted toricity induced by the manufacturing process.

U.S. Pat. No. 4,197,266 discloses an apparatus for forming ophthalmic lenses, the apparatus comprising cooperating first and second mold surfaces to form a mold cavity. The assembled molds further comprise an annular reservoir connected with the mold cavity. In operation said reservoir provides lens forming material to the mold cavity of the lens, to compensate for shrinkage of the lens material upon curing.

U.S. Pat. No. 5,269,867 discloses a method for producing optical devices, wherein curing is effected by irradiation of the resin through a filter so as to be uniformly incident on the resin, thereby preventing stress or shrinkage on the resin surface upon curing.

In spite of all prior art attempts shrinkage is still a problem to be addressed in the manufacture of ophthalmic lenses, in particular in the fully automated manufacture of contact lenses using rigid molds, and even more so in the manufacture of silicone hydrogel contact lenses. The present invention therefore is directed to an improved process and apparatus for the manufacture of an ophthalmic lens, in particular a silicone hydrogel contact lens.

It is an object of the present invention to provide an improved process for manufacturing an ophthalmic lens, in particular a silicone hydrogel contact lens, which reduces or avoids defects, in particular uneven lens surfaces (with so called "grooves" or "road maps"), which may occur due to shrinkage of the lens forming material upon polymerization and/or cross-linking.

It is a further object of the present invention to provide an improved apparatus for forming an ophthalmic lens, in particular a silicone hydrogel contact lens, which reduces or avoids defects, in particular uneven lens surfaces (with so called "grooves" or "road maps"), which may occur due to shrinkage of the lens forming material upon polymerization and/or cross-linking.

It is still a further object of the present invention to provide an improved process and apparatus for manufacturing an ophthalmic lens, in particular a silicone hydrogel contact lens, which reduces stress in the final lens that may occur due to shrinkage of the lens forming material upon polymerization and/or cross-linking.

SUMMARY OF THE INVENTION

These objects are met by a process and by an apparatus in accordance with the respective independent claims. Improvements and advantageous embodiments of the process and the apparatus according to the invention are defined in the respective dependent claims.

The present invention in one aspect relates to a process for manufacturing an ophthalmic lens, comprising the steps of providing a mold assembly comprising a first mold half having a first molding surface and a second mold half having a second molding surface; dosing a lens forming material into the first mold half; closing the first and second mold halves to form a mold cavity defining the shape of the ophthalmic lens; curing the lens forming material in the mold cavity; opening the first and a second mold halves; removing the lens from the first or second mold half; wherein
(i) the step of closing the first and second mold halves comprises moving the first and second mold halves to an intermediate closed position, wherein the first and second molding surfaces of the first and second mold halves are arranged at a distance increase (d1) relative to a final distance (d0) in a final closed position; and (ii) during curing of the lens forming material moving the mold halves to the final closed position. In the intermediate closed position the distance increase relative to the final distance in the final closed position is preferably from 1 μm to 100 μm, more preferably from 2 μm to 50 μm and most preferably from 5 μm to 15 μm.

Preferably the step of closing the first and second mold half comprises
(a) moving the first and second mold halves to the final closed position, where the intermediate distance increase (d1) is 0;
(b) re-opening the mold halves to the intermediate closed position; and thereafter, in the step of curing the lens forming material, during curing of the lens forming material moving the mold halves back to the final closed position.

Preferably, the step of re-opening comprises the following steps: locking the first mold half in the final closed position; positioning a means for re-opening at the back surface of the second mold half, at the reference surface of the second mold half, or between two reference surfaces of the first and second mold halves; locking the means for re-opening in a re-opening position; and actuating the means for re-opening to move the second mold half to a position such that the first and second mold halves are in the intermediate closed position.

During curing of the lens forming material the mold halves are preferably actively moved to the final closed position by actuating a closing means. More preferably the first mold half and/or the second mold half is continuously moved to a position such that the first and second mold halves are in the final closed position during the curing period of the lens forming material at a speed of from about 0.1 μm/s to about 5 μm/s, even more preferably about 0.5 μm/s to about 2 μm/s, most preferably about 1 μm/s.

Further, during curing of the lens forming material the distance increase (d1) is preferably measured with a interferometric measuring device, and the measured distance is preferably used for controlling the relative movement of the first and second mold halves in accordance with the characteristics of the curing process for the said lens forming material. In one embodiment of the present invention the interferometric measuring device is a laser interferometric measuring device.

In another aspect of the invention, the mold halves are passively moved to the final closed position by tractive forces exerted to the mold halves by the lens forming material during curing of the lens forming material.

The first and second mold halves are preferably aligned and centered by means for aligning and/or centering the two mold halves in relation to each other, wherein the accuracy of centering the axis of the first in relation to the second mold half is ≤5 μm, and wherein the tilt error of aligning the two mold halves with respect to each other in the direction of the optical axis is ≤5 μm.

In yet another aspect the present invention relates to an apparatus for forming an ophthalmic lens comprising a mold assembly with a first mold half having a first molding surface and a second mold half, having a second molding surface (106), between which in a final closed position of the mold assembly a mold cavity is formed that defines the shape of an ophthalmic lens;
means for arranging the first and second mold half at an intermediate closed position; wherein in the intermediate closed position, the first and second molding surfaces of the first and second mold halves are spaced apart at a distance increase (d1) relative to a final distance (d0) in a final closed position of the mold halves; and means for moving the first and second mold halves from the intermediate closed position to the final closed position.

Preferably, the first and second molding surfaces of the first and second mold halves in the intermediate closed position are spaced apart from each other at a distance increase (d1) of from about 1 μm to about 100 μm with reference to a final distance (d0) in a final closed position, more preferably from about 2 μm to about 50 μm and most preferably from about 5 μm to about 15 μm.

The means for arranging the first and second mold halves in the intermediate closed position are preferably selected from friction type means or spacer type means, such as side wall and guide sleeve or spacer. The means for arranging the first and second mold halves at a distance increase (d1) preferably comprise a compressible sleeve or compressible guide sleeve.

The means for re-opening the first and second mold half to the intermediate closed position, are preferably selected from the group consisting of splines, a plunger comprising a piezoelectric element, or a spreading tool comprising a piezoelectric element.

The apparatus for forming an ophthalmic lens preferably further comprises means for actively moving the two mold halves to the final closed position, selected from the group consisting of an actuated plunger, which may be actuated by spring force, pneumatic pressure, hydraulic pressure or by an electrical or mechanical drive.

The apparatus for forming an ophthalmic lens preferably further comprises a interferometric measuring device which is arranged such, that during curing of the lens forming material the distance increase (d1) can be measured, and which is connected to the means for moving the mold halves to control the relative movement of the first and second mold halves in accordance with the measured distance increase (d1) and the characteristics of the curing process for the lens forming material. In one embodiment of the present invention the interferometric measuring device is a laser interferometric measuring device.

In still another aspect the present invention relates to the use of a process and/or an apparatus as described above, for manufacturing a silicone hydrogel contact lens.

BRIEF DESCRIPTION OF THE DRAWINGS

These and still further features will become apparent from the following description of exemplary embodiments of the invention, reference being made to the schematic drawings which are not to scale, in which.

DEFINITIONS

Figure 1:
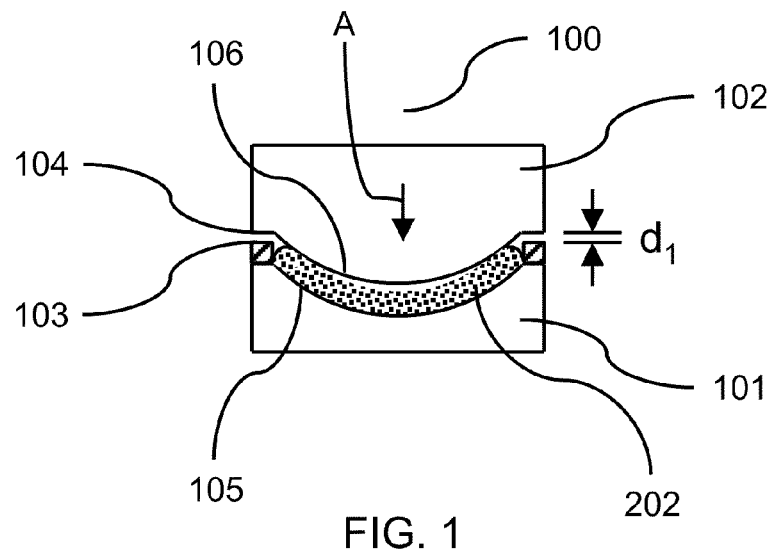
FIG. 1 shows an embodiment of a mold assembly according to the present invention in an intermediate closed position.

A mold half is a part of a mold assembly for forming an ophthalmic lens, in particular a silicone hydrogel contact lens, preferably in the so-called mold or full-mold process. The mold half comprises at least a body part as well as a molding surface, i.e. the lens forming area. In general the lens forming area for a male mold half has a convex shape and the lens forming area for a female mold half has a concave shape.

When assembled to a mold, the molding surfaces of the two mold halves form a mold cavity between them, the mold cavity defining the shape of the ophthalmic lens between the male and female molding surface. A final distance $d0$ of the two molding surfaces in a final closed position of the mold assembly is defining the thickness of the final lens, in particular the so-called center thickness. An open position of a mold assembly is defined such that there is no contact of the molding surface of the second mold half with the lens forming material in the first mold half. More generally an open position of a mold assembly is defined as comprising any arrangement wherein the two mold halves are spaced apart at a distance such, that, for example, dosing of a lens forming material into a first mold half without interference of the second mold half may be accomplished. Preferably the distance in an open position is larger than 1 mm. More preferably the distance in an open position is larger than 5 mm. Most preferably the distance in an open position is larger than 10 mm.

An intermediate closed position of a mold assembly is defined as the two mold halves of said mold assembly being in close proximity but not yet in the final closed position. In an intermediate closed position the molding surface of the first and second mold halves are spaced apart at a distance which is larger than the final distance $d0$. This intermediate distance as compared to the final distance $d0$ is designated as intermediate distance $d0+d1$, wherein $d1$ is the so-called increase or distance increase. The distance increase is in the range of several to a few micrometers added to the final distance. In the intermediate closed position the molding surface of the second mold half is already in contact with the lens forming material in the first mold half, and the distance increase $d1$ is more than zero. More preferably the distance increase $d1$ in an intermediate closed position is between about 1 μm and about 100 μm, even more preferably between about 2 μm and about 50 μm, and most preferably between about 5 μm and about 15 μm. It is to be noted though, that the molding surface of the second mold half in an intermediate closed position does not necessarily have to be in contact with the lens forming material.

The term curing in the context of the present invention comprises polymerization and/or cross-linking. Preferably the term curing herein comprises polymerization of a monomer system and/or cross-linking of a macromer or pre-polymer system, or mixtures thereof.

Actively closing is defined as a closing of the mold halves during the curing period, wherein the closing may be controlled to follow a defined closing profile. The closing means may be, for example, an actuated plunger or a piezoelectric element. In one embodiment, the closing step preferably is accomplished with a defined closing speed, which is adapted to the characteristics of the respective curing process. For example, with an intermediate distance $d1$ of about 10 μm and a curing period of about 5 seconds, the closing speed is selected to be about 2 μm/second based on the shrinkage characteristics of the respective lens forming material in a specific curing process. Such a closing profile may also be referred to as continuous closing profile or linear closing profile. In another embodiment, the closing step is following a defined closing profile which may comprise a different closing speed for each time increment of the curing process.

Passively closing is dependent on surface properties of the molding surfaces of the lens mold and the lens forming material. Further criteria may be the surface properties of the guide sleeve and the side walls of the mold; the dead weight of the male mold half as well as the forces exerted by the shrinking lens forming material. In a specific embodiment of the mold assembly, passively closing of the mold requires that the sum of forces exerted by the dead weight force of the second mold half and the tractive force of the shrinking lens forming material is larger than the friction force between the side wall of the mold and the guide sleeve.

A zero force measurement of the shrinkage of a lens forming material upon curing shows a specific shrinkage profile for the said lens forming material, wherein zero force means that no external forces are interfering with the forces exerted by the shrinking lens forming material in itself. A mold assembly as of the present invention would follow said zero force profile upon passively closing the mold from the intermediate closed position to the final closed position only if all mechanical components of the assembly are perfectly rigid and frictionless. Actively closing the mold halves with a closing means, in a first approximation, may use such a zero force profile for defining a profile for actively closing the mold assembly. The defined closing profile of the closing means however only really follows the specific shrinkage profile if all mechanical components are perfectly rigid and frictionless. As said assumption is usually difficult to be achieved in a manufacturing process it would be desirable to follow the actual shrinkage profile of a lens forming material through a closed-loop measurement and control process. The use of an interferometric measurement device allows to monitor the actual mold gap, i.e. the distance between the two mold halves. In combination with data from a zero force measurement of the shrinkage upon curing of the respective lens forming material, the closing device can be actuated with a closing profile that corresponds to the actual shrinkage profile of the said lens forming material. The active closing of the mold assembly therefore may resemble a zero force closing profile of the mold assembly. It is to be noted, that with said closed-loop measurement and control process any other closing profile which may be suitable for curing a lens forming material to form a contact lens can be applied to the closing means.

DETAILED DESCRIPTION OF EMBODIMENTS

FIG. 1 shows an embodiment of a mold assembly according to the present invention, which is generally designated with reference numeral 100. The mold assembly 100 comprises a first mold half 101 and a second mold half 102. The first mold half 101, which is a female mold half, has a molding surface 105. The second mold half 102 is a male mold half and has a molding surface 106. The molding surfaces 105, 106 are bordered by a zone in which the two mold halves make contact. According to FIG. 1 this zone is formed by protrusion 103 on the first mold half 101, and bearing 104 on the second mold half 102. FIG. 1 shows the mold assembly in an intermediate closed position, wherein the protrusion 103 and the bearing 104 are spaced apart an intermediate distance d1. The intermediate distance d1 defines the proximity of the two mold halves as compared to the final closed position of the mold halves, in which the molding surfaces are spaced apart from each other a final distance d0, which corresponds to the desired thickness of the lens, i.e. the center thickness of the lens. In the intermediate closed position the molding surfaces are spaced apart at a distance d1+d0, whereas in the final closed position, in which d1 is 0, the molding surfaces are spaced apart at a final distance d0.

Figure 2:
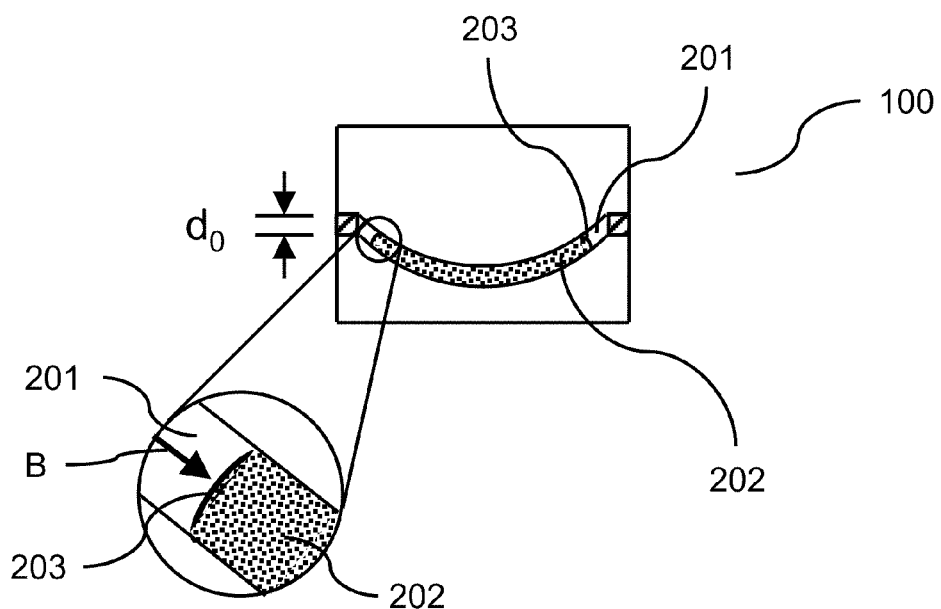
FIG. 2 shows the mold assembly of FIG. 1 in a final closed position.

Upon closing of the mold halves into the final closed position (indicated by the arrow A in FIG. 1), the protrusion 103 is contacting the bearing 104, as is shown in FIG. 2. The first 105 and second 106 molding surfaces are forming the mold cavity 201 which defines the shape of the lens. The mold cavity is filled with a lens forming material 202. The distance d0 corresponds to the thickness of the final lens. The arrow A in FIG. 1 indicates the direction in which the second mold half moves from the intermediate closed position to the final closed position, which is shown in FIG. 2. In FIG. 2, the final distance d0 designates the distance between the first molding surface 105 and second 106 molding surface in the final closed position. The lens forming material 202 is cured between the first 105 and second 106 molding surfaces to form the lens.

The detail enlargement included in FIG. 2 symbolically shows the shrinkage of the lens upon curing of the lens forming material. The arrow B in the detail enlargement of FIG. 2 indicates the direction the edge 203 of the lens (or the lens forming material) is retracting upon curing. The shrinkage of the lens, which typically has a diameter of 12 to 16 mm, preferably about 14 mm, and a thickness of from about 80 μm to about 120 μm, preferably about 100 μm is in the micrometer range. For illustration purposes the shrinkage in the schematic representation of FIG. 2 is significantly exaggerated.

Figure 3:
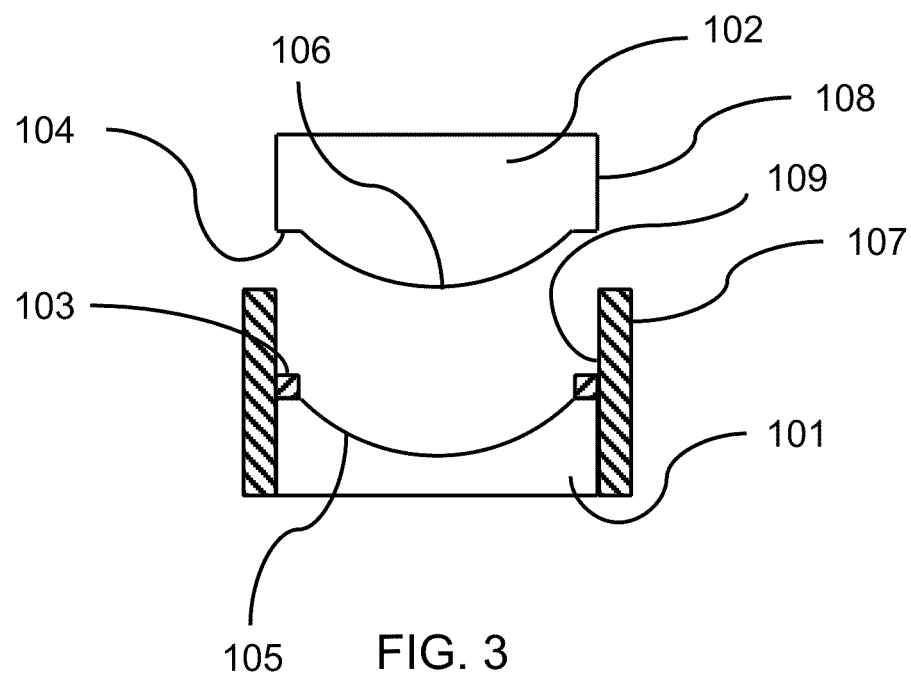
FIG. 3 shows another embodiment of a mold assembly according to the present invention in an open position.

FIG. 3 shows another embodiment of a mold assembly according to the present invention which comprises a first mold half 101 and a second mold half 102, which are shown in an open position. The embodiment of FIG. 3 further comprises a guide sleeve 107 which is attached to the first mold half 101. The guide sleeve is formed in such a way that it can receive the second mold half 102, wherein the side wall 108 of the second mold half 102 is in sliding contact with the inner surface 109 of the guide sleeve 107.

Figure 4:
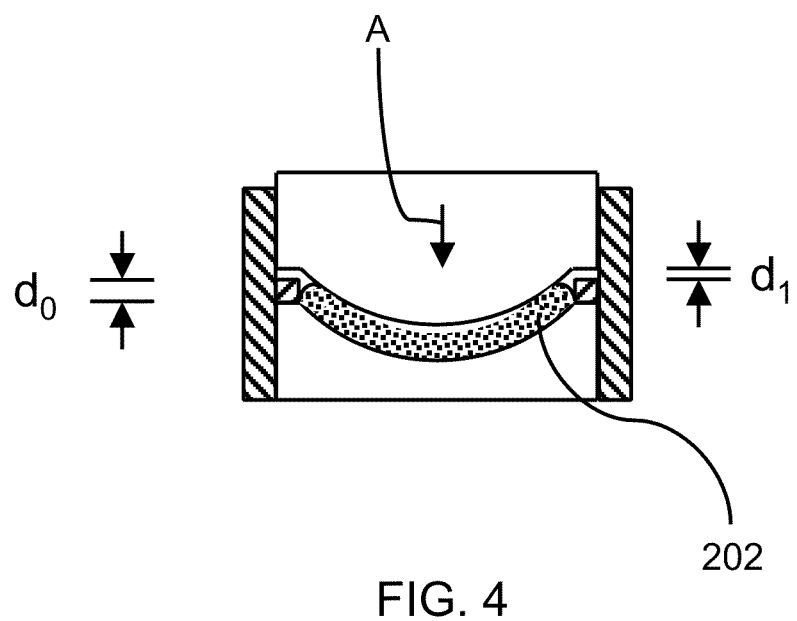
FIG. 4 shows the mold assembly of FIG. 3 in a intermediate closed position.

FIG. 4 shows the mold cavity filled with a lens forming material 202. The mold assembly is shown in an intermediate closed position, with the two mold halves spaced apart at an intermediate distance d1 larger than a final distance in the final closed position. The molding surface of the second mold half contacts the lens forming material 202. Arrow A in FIG. 4 indicates the direction the second mold half 102 moves from the intermediate into the final closed position. The sliding contact of the side wall 108 of the second mold half 102 with the inner surface 109 of the guide sleeve 107 provides for a defined friction force, which, in a first step, allows to arrange the second mold half 102 in the intermediate position. In a second step the defined friction force allows for a controlled movement of the second mold half to the final closed position during the curing of the lens forming material. The movement of the second mold half occurs due to tractive forces which are exerted to its mold surface by the contact with the shrinking lens forming material 202.

Figure 5:
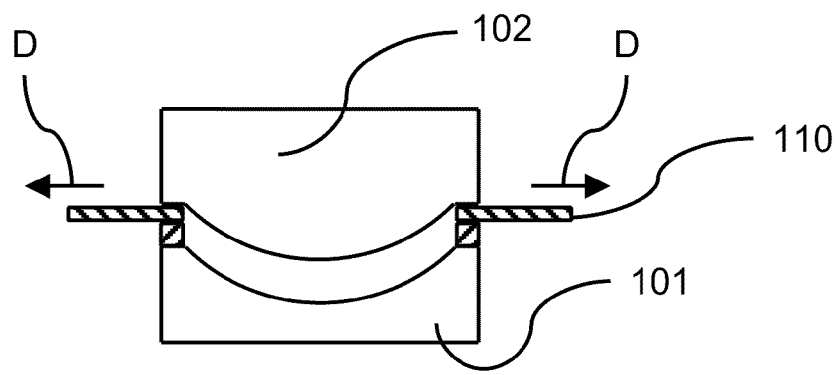
FIG. 5 shows a further embodiment of a mold assembly according to the present invention in an intermediate closed position.
Figure 6:
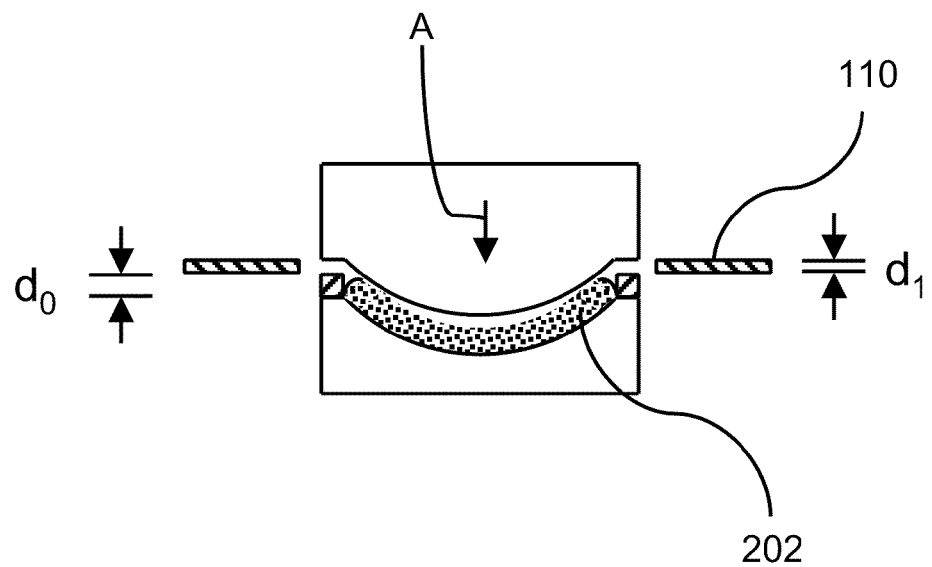
FIG. 6 shows the mold assembly of FIG. 5, which is still in the intermediate closed position.

FIG. 5 shows another embodiment of a mold assembly which is similar to that of FIG. 1. The mold assembly comprises a first mold half 101 and a second mold half 102, which are shown in an intermediate closed position. According to FIG. 5 there is provided a spacer 110 which, upon movement of the first 101 and second 102 mold halves to an intermediate closed position, defines an intermediate distance d1 between the protrusion 103 and the bearing 104. For curing the lens forming material 202 in the mold cavity to form the final lens the spacer 110 is removed, as indicated by arrow D in FIG. 5. The arrow A in FIG. 6 indicates the direction of movement of the second mold half from the intermediate into the final closed position after the spacer 110 has been removed. Preferably, after removing the spacer 110 and upon curing of the lens forming material, the second mold half 102 is moving into the final closed position through the tractive forces exerted to its mold surface by contact to the shrinking lens forming material 202.

Figure 7:
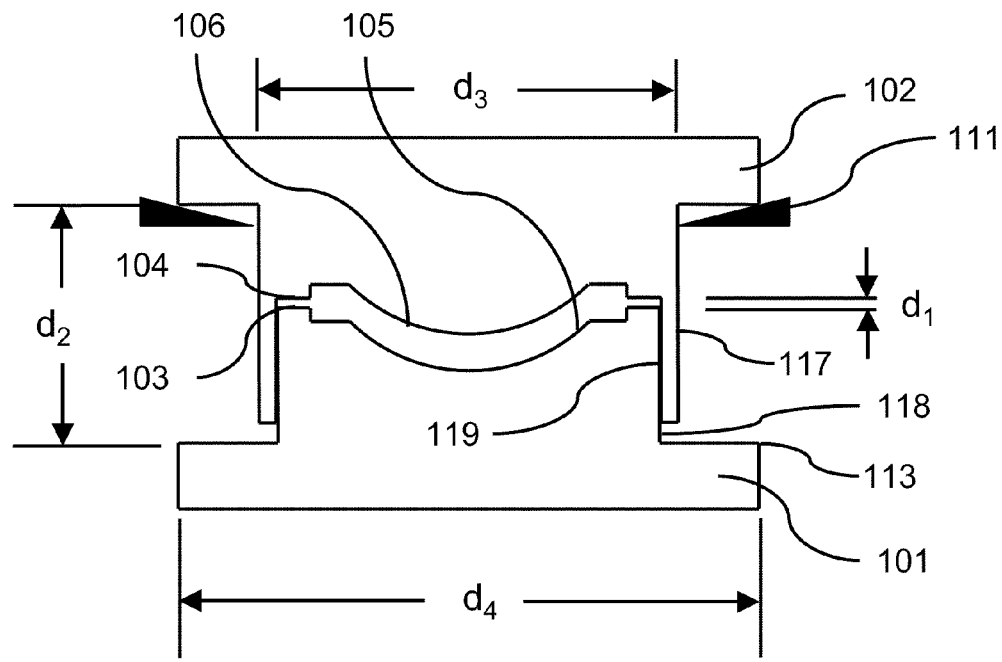
FIG. 7 shows still another embodiment of a mold assembly according to the present invention in an intermediate closed position.

FIG. 7 shows a further embodiment of a mold assembly according to the present invention, which comprises a first mold half 101 and a second mold half 102. The first mold half 101, which is a female mold half, has a molding surface 105. The second mold half 102 is a male mold half and has a molding surface 106. The molding surfaces 105, 106 are bordered by a zone in which the two mold halves make contact. According to FIG. 7 this zone is formed by protrusion 103 on the first mold half 101, and a bearing 104 on the second mold half 102. A guide sleeve 117 is attached to the second mold half 102. The guide sleeve is formed in such a way that it can receive the first mold half 101, wherein the side wall 118 of the first mold half 101 is in sliding contact with the inner surface 119 of the guide sleeve 117. The guide sleeve preferably is construed in such a way, that in operation it aligns and/or centers the two mold halves relative to each other.

In FIG. 7 the mold assembly is shown in an intermediate closed position, wherein the protrusion 103 and the bearing 104 are spaced apart at an intermediate distance d1. The embodiment further comprises a first outer reference surface 113 of the first mold half 101 and a second outer reference surface 114 of the second mold half 102. In the intermediate closed position the two reference surfaces 113, 114 are spaced apart at a distance d2, which corresponds to the intermediate distance d1 plus a distance d5, wherein d5 is the distance of the two reference surfaces in the final closed position, in which the intermediate distance d1 is 0. In the intermediate closed position the molding surfaces are spaced apart a distance d1+d0, whereas in the final closed position where d1 is 0, the molding surfaces are spaced apart at a final distance d0. The final distance d0 is the distance between the first 105 and second 106 molding surface in the final closed position. The first 105 and second 106 molding surface are forming the mold cavity 201 which defines the shape of the lens. The final distance d0 corresponds to the desired thickness of the final lens. In FIG. 7 the outer diameter of the mold assembly as measured across the outer reference surfaces 113, 114 is designated with d4, whereas the inner diameter of the mold assembly including the guide sleeve 117 is designated with d3.

There may be provided splines 111 for moving the mold half 102 from the final closed position to the intermediate closed position. Arrows C in FIG. 8 indicate the direction the splines 111 are moved for lifting the mold half to the intermediate closed position, which is shown in FIG. 7. Removing the splines 111 in the opposite direction would again lower the mold half 102 to the final closed position, which is shown in FIG. 8.

Figure 8:
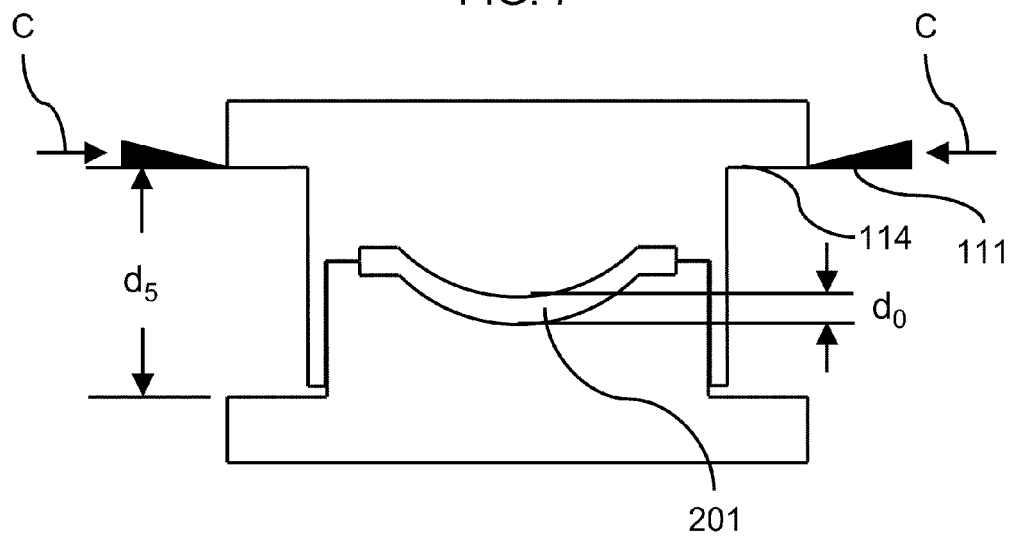
FIG. 8 shows the mold assembly of FIG. 7 in a final closed position.
Figure 9:
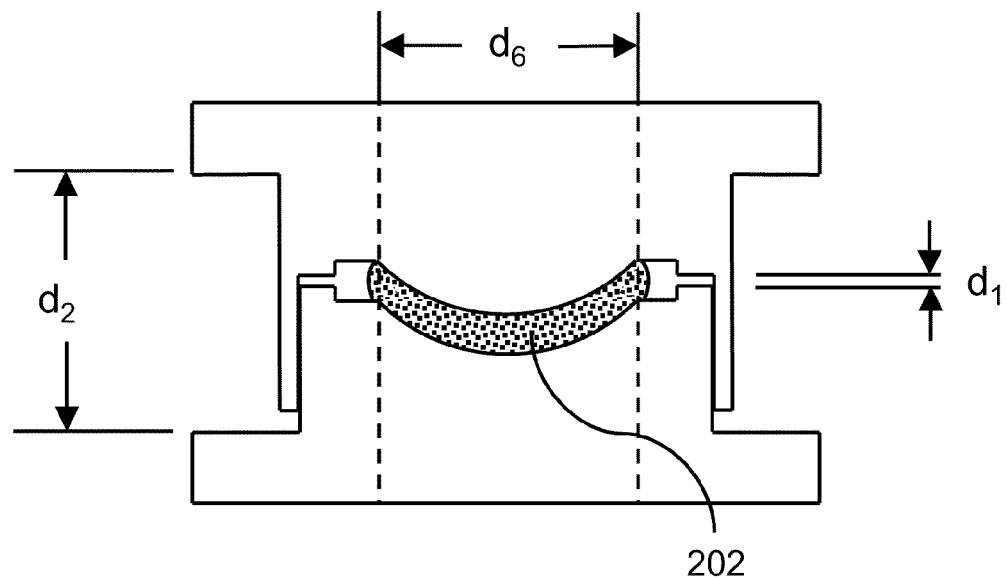
FIG. 9 shows the mold assembly of FIG. 7 in the intermediate closed position and filled with lens forming material.
Figure 10:
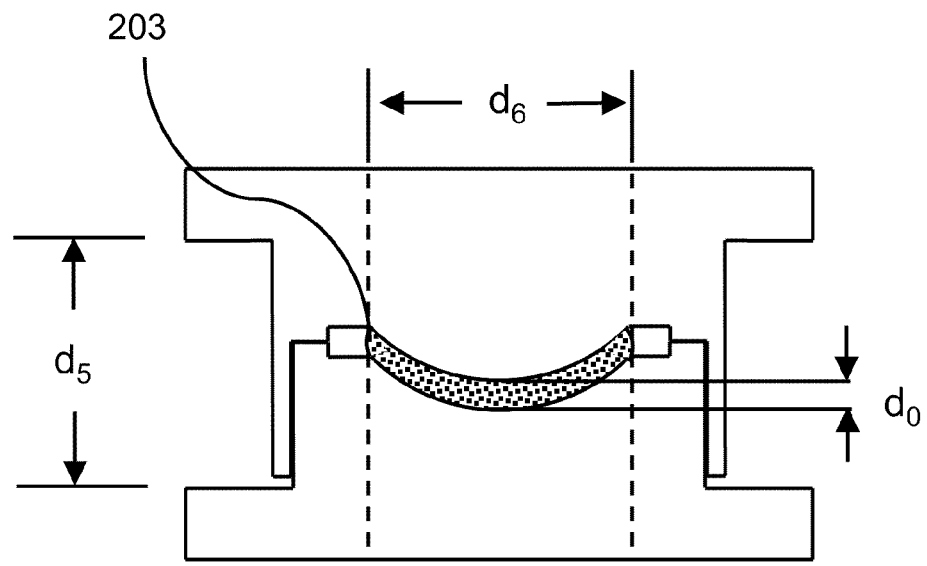
FIG. 10 shows the mold assembly of FIG. 9 in the final closed position and filled with lens forming material.

FIGS. 9 and 10 are based on FIGS. 7 and 8. FIG. 9 shows a mold assembly according to FIG. 7 in an intermediate closed position. A lens forming material 202 is shown in the mold cavity in order to form a final lens therefrom. Upon curing of the lens forming material, the second mold half will move to the final closed position as is shown in FIG. 10, through the tractive forces exerted to the mold surfaces by contact with the shrinking lens forming material 202. A distance d6 indicates the spatial limitation of UV light used for curing the lens forming material. In FIG. 10 the edge 203 of the lens, or of the lens forming material, respectively, is shown, which is defined by the spatial limitation of UV light used for curing the lens forming material.

Figure 11:
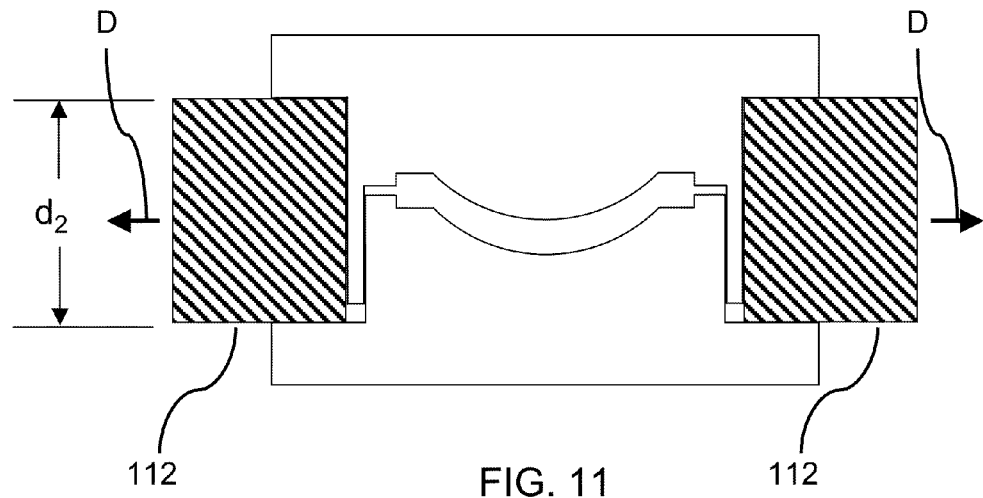
FIG. 11 shows a further embodiment of a mold assembly according to the present invention in an intermediate closed position.
Figure 12:
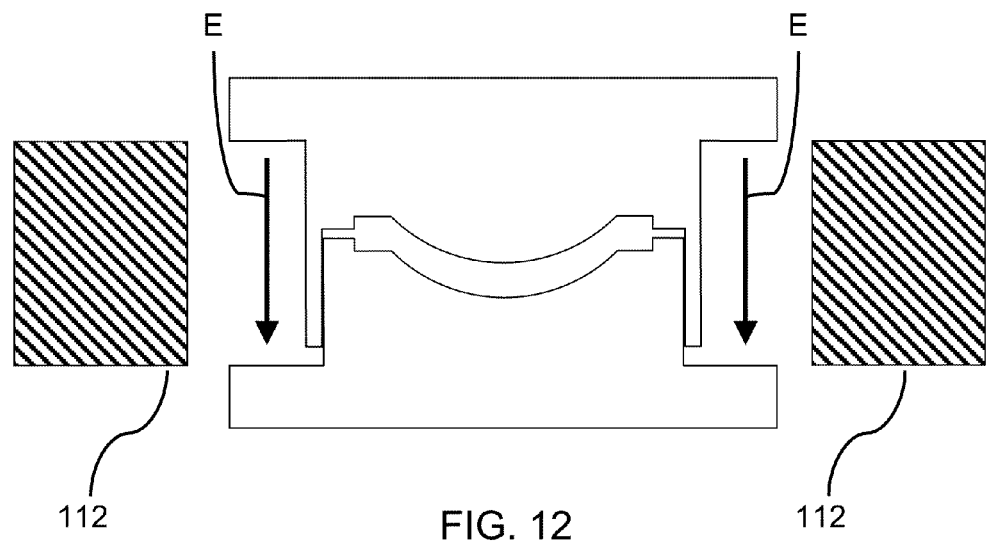
FIG. 12 shows the mold assembly of FIG. 11 at another process stage but still in the intermediate closed position.

FIG. 11 shows a mold assembly according to FIG. 7 in an intermediate closed position. The embodiment depicted in FIG. 11 further comprises spacers 112 which, upon moving the first and second mold halves to an intermediate closed position, define a distance d2 between a first reference surface 113 and a second reference surface 114. The spacers 112 are removed for curing the lens forming material in the mold cavity to form the final lens, which is indicated by the arrows D in FIG. 11. Arrows E in FIG. 12 indicate the direction of movement of the second mold half from the intermediate to the final closed position. Preferably, after removing the spacers 112 and upon curing of the lens forming material, the second mold half is moving to the final closed position due to traction forces exerted to its mold surface by contact with the shrinking lens forming material.

Figure 13:
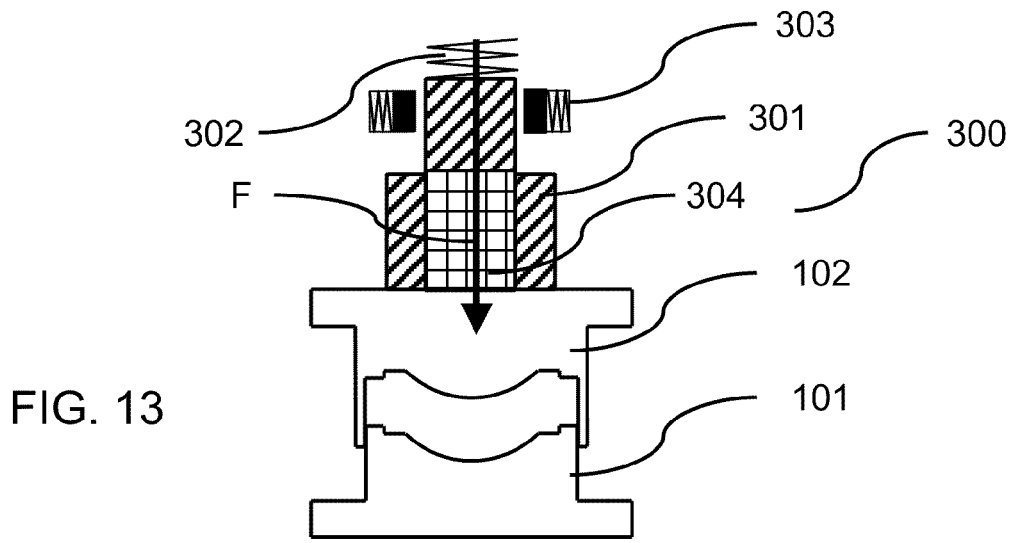
FIG. 13 shows an embodiment of an apparatus according to the present invention, comprising a mold assembly which is in an open position.
Figure 14:
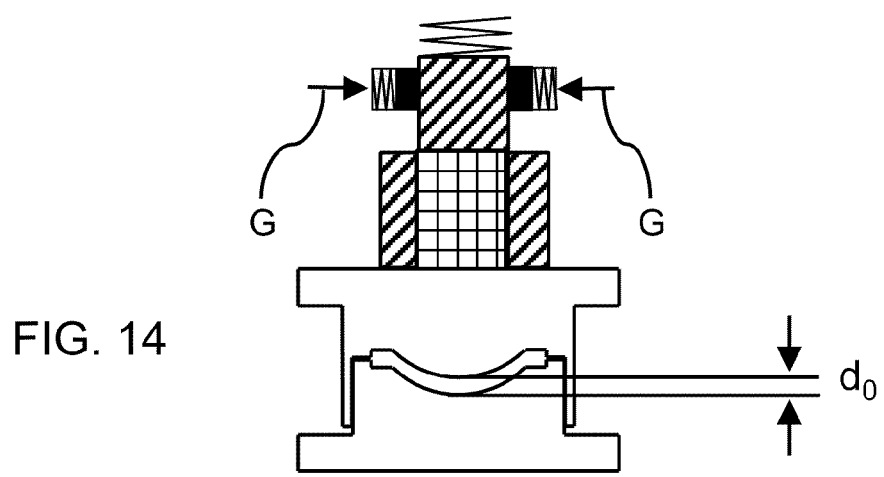
FIG. 14 shows the apparatus of FIG. 13 in a final closed position.
Figure 15:
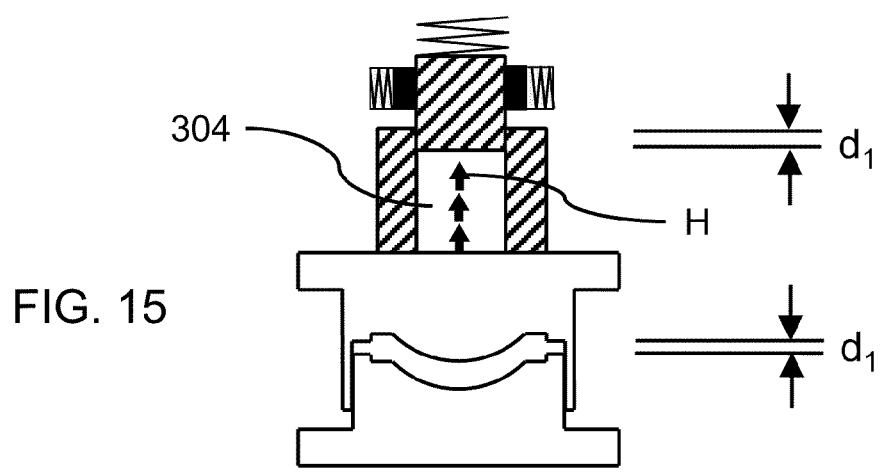
FIG. 15 shows the apparatus of FIG. 13 in an intermediate closed position.

FIG. 13 shows an apparatus according to the present invention comprising a mold assembly according to FIG. 7 in an open position. The mold assembly comprises a first mold half 101 and a second mold half 102. Further, the apparatus comprises a positioning and closing means 300 which is removably attached to the second mold half 102. The positioning and closing means 300 comprises a plunger 301, an actuator 302 for the plunger and two lock pins 303. Further, the positioning and closing means 300 comprises a piezoelectric element 304. Arrow F in FIG. 13 indicates, that the actuator 302 moves the plunger 301, together with the piezoelectric element 304 and the second mold half 102 to the final closed position which is depicted in FIG. 14. The plunger 301 is locked by actuating the lock pins 303 in a position where the mold halves are in a final closed position (Arrows G, FIG. 14), with the molding surfaces spaced apart at a final distance d0. FIG. 15 shows that, by activating the piezoelectric element 304, the plunger 301, and therewith the second mold half 102 are moved to an intermediate closed position, in which the distance between the molding surfaces is increased by an intermediate distance d1, as is indicated by arrows H. In a further step, which is not shown in the drawings, by deactivating the piezoelectric element 304 the second mold half 102 is moved back again to the final closed position.

Figure 16:
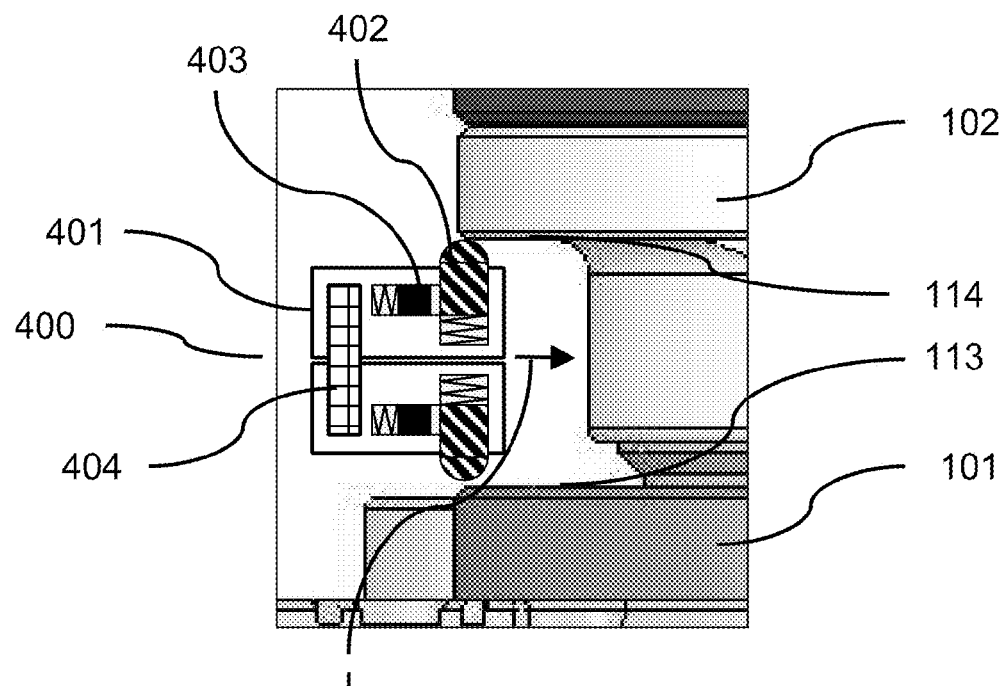
FIG. 16 shows another embodiment of an apparatus according to the present invention, comprising a mold assembly which is in a final closed position.
Figure 17:
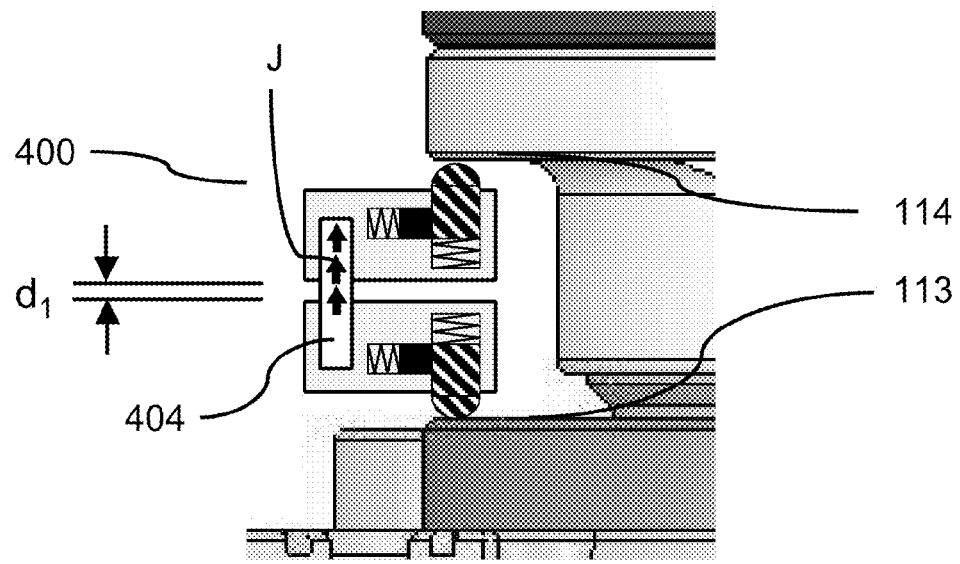
FIG. 17 shows the apparatus of FIG. 16, comprising a mold assembly which is in an intermediate closed position.

FIG. 16 shows another embodiment of an apparatus according to the present invention comprising a mold assembly according to FIG. 7 in a final closed position. The mold assembly comprises a first mold half 101 and a second mold half 102 as well as reference surfaces 113 and 114. Further, the apparatus is provided with a spreading tool 400, which is arranged between the two reference surfaces 113 and 114 of the two mold halves 101 and 102. The spreading tool 400 comprises a body 401 having an upper and a lower half, two lock pins 402, which can be locked by wedges 403, and a piezoelectric element 404. In operation the spreading tool 400 is first approached to the mold assembly to be arranged between the two reference surfaces 113 and 114 of the two mold halves 101 and 102, wherein the spreading tool 400 is in a closed position (indicated by arrow I in FIG. 16). Then, the lock pins 402 are actuated in order to engage with the two reference surfaces 113 and 114. Once this is accomplished, the lock pins 402 are locked in their position by actuating the wedges 403. As is shown by arrows J in FIG. 17, subsequently the piezoelectric element 404 is activated in order to force the two halves of the spreading tool 400 apart from each other into an open position. Thereby the first and second mold halves 101, 102 are moved away from each other to an intermediate closed position. In a further step, which is not shown in the drawings, the piezoelectric element 404 is deactivated, the spreading tool is be moved again into the closed position and can be removed from the mold assembly accordingly. The first and second mold halves 101, 102 during curing of the lens forming material are then moving, either passively or actively, to the final closed position in which the intermediate distance increase d1 is 0.

In an alternative embodiment, which is not shown in the drawings, the mold assembly of any of the previous embodiments according to FIGS. 1 to 17, in a first step, is closed to the final closed position. Then, in a second step, the mold assembly is re-opened to an intermediate closed position, e.g. by lifting the second mold half to a distance increase d1. Finally, during curing of the lens forming material, the second mold half is again moved back to the final closed position.

The mold halves may be passively closed from the intermediate to the final closed position through the tractive forces exerted to the mold surfaces by contact with the shrinking lens forming material, as well as by the dead weight force of the second mold half.

Alternatively during curing of the lens forming material an external joining force may be applied to one or both mold halves for actively closing the two mold halves from the intermediate to the final closed position. Actively closing the two mold halves is a preferred mode of operation of the present invention.

Figure 20:
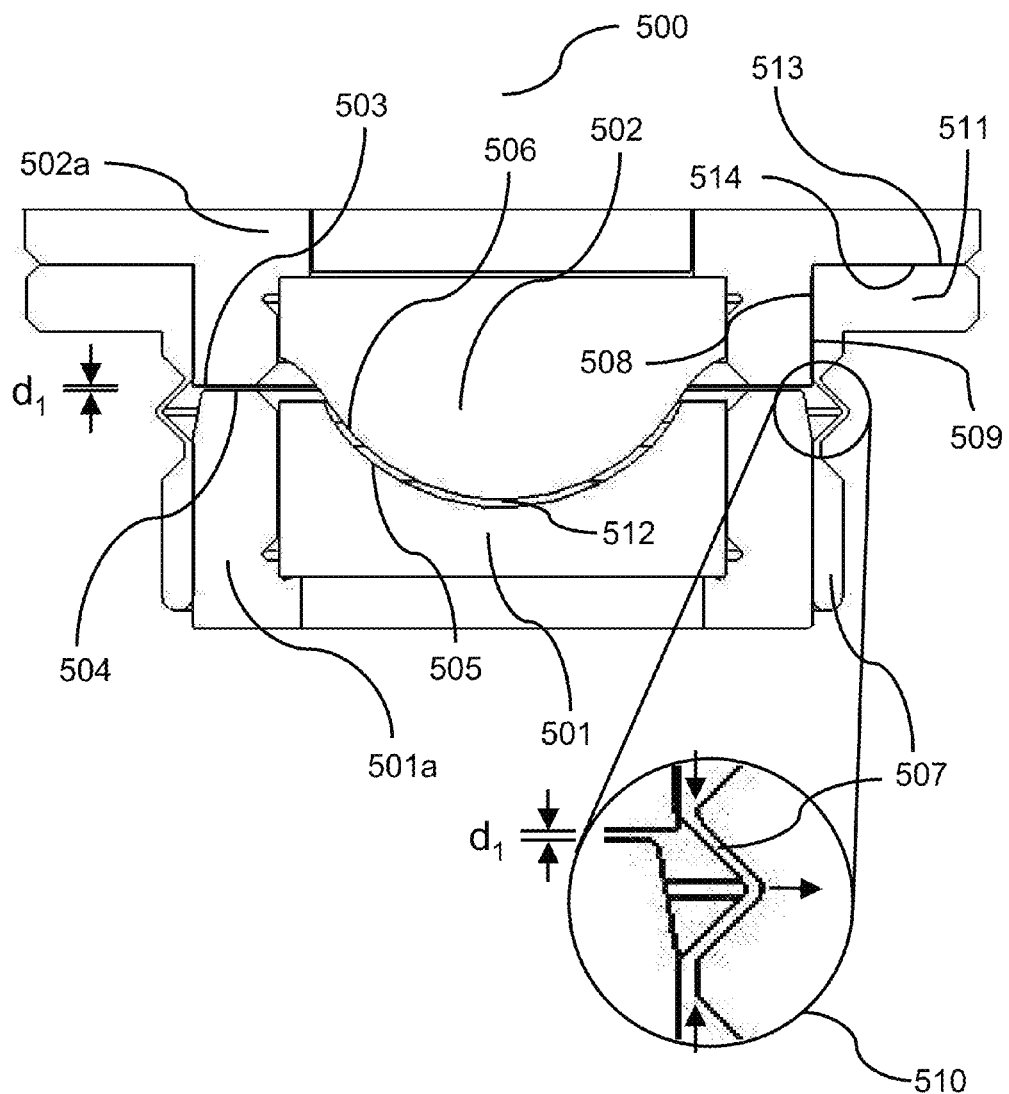
FIG. 20 shows a further embodiment of a mold assembly according to the present invention comprising a compressible sleeve.

FIG. 20 shows another embodiment of a mold assembly 500 according to the present invention which comprises a first mold half 501 and a second mold half 502, which are shown in an intermediate closed position. The embodiment of FIG. 20 further comprises a guide sleeve 507 which is fixedly attached to the body 501a of the first mold half 501. The guide sleeve is formed in such a way that it can receive the body 502a of the second mold half 502, wherein the side wall 508 of the second mold half body 502a is in sliding contact with the inner surface 509 of the guide sleeve 507. The first mold half 501, which is a female mold half, has a molding surface 505. The second mold half 502 is a male mold half and has a molding surface 506. The molding surfaces 505, 506 are bordered by a zone in which the two mold halves make contact. According to FIG. 20 this zone is formed by protrusion 504 on the body 501a of the first mold half 501, and a bearing 503 on the body 502a of the second mold half 502. The guide sleeve 507 preferably is construed in such a way, that in operation it aligns and/or centers the two mold halves relative to each other. Further, the guide sleeve 507 preferably has a compressible part 510, which is compressible at least in the range of the distance increase (d1). In operation, the protrusion part 511 of the guide sleeve with its first outer reference surface 514 contacts the bearing surface 513 (or second outer reference surface 513 of the second mold half body 502a). Upon moving the two mold halves towards each other, which in FIG. 20 is indicated by the two vertical arrows in the enlarged detail, the compressible part 510 of the guide sleeve 507 is compressed until the two mold halves are in the final closed position in which the intermediate distance increase d1 is 0. As described above, said movement of the mold halves 501, 502 may be an active movement actuated by a closing means (not shown in this embodiment), or the mold halves 501, 502 may be moved passively by tractive forces exerted to the mold halves by the lens forming material (not shown in this embodiment) during curing of the lens forming material.

In still another embodiment of the invention the mold halves in the apparatus and process according to the present invention further comprise means for aligning and/or centering the mold halves as described in the published patent application WO-A-99/20455, which is incorporated herein by reference. In particular page 8, line 1 to page 9, line 9 of WO-A-99/20455 and page 9, line 27 to page 10, line 15 of WO-A-99/20455 are incorporated herein by reference as disclosing means for aligning and/or centering of mold halves.

Figure 21:
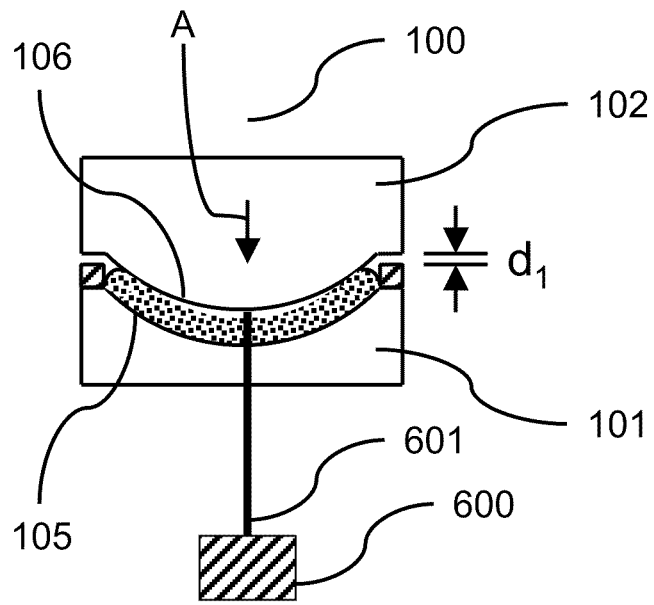
FIG. 21 shows the mold assembly of FIG. 1 with an interferometric measuring device.
Figure 22:
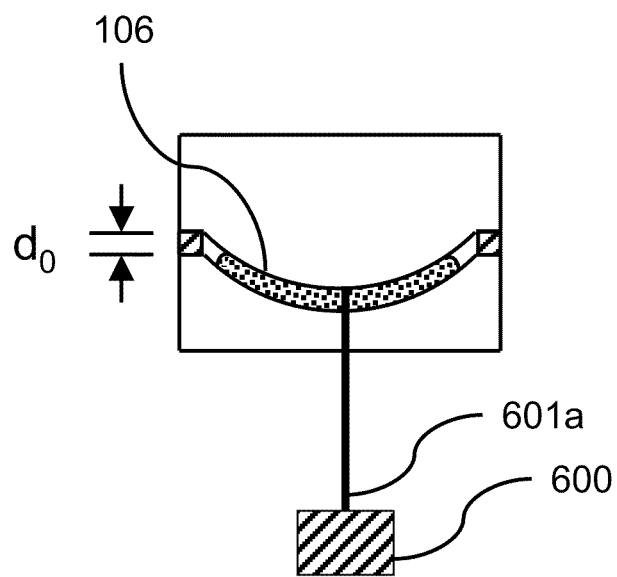
FIG. 22 shows the mold assembly of FIG. 2 with an interferometric measuring device.

FIG. 21 shows the mold assembly of FIG. 1 with an interferometric measuring device 600 attached to or arranged at the mold assembly 100. The interferometric measuring device emits a measuring beam 601 through the first mold half 101 to the second mold half 102. The measuring beam is reflected (partly) by the first molding surface 105, as well as by the second molding surface 106. Due to the curved geometry of the molding surfaces it is preferable that the measuring beam 601 be directed to the center of both mold halves such that as much of the measuring beam as possible is sufficiently reflected for detection at the interferometric measuring device. Accordingly, during curing of the lens forming material 202 the change in the distance increase d1 can be directly measured by the interferometric measuring device until the final distance d0 in the final closed position is reached (shown in FIG. 22), which corresponds to the center thickness of the cured contact lens. Further, a means for moving the mold halves may be provided (not shown in the FIGS. 21 and 22), which may be so connected with the interferometric measuring device 600, that the actually measured distance can be used for controlling the relative movement of the mold halves 101, 102 in accordance with the specific characteristics of the respective lens forming material upon curing.

In a typical set-up of an interferometer as used in an interferometric measuring device described above, the path length difference between two beams is determined. An initial beam is divided into a reference beam and a measuring beam, e.g. in an optical element such as a semireflecting mirror. The reference beam is for example decoupled from an optical fibre and immediately lead back into the fibre as the reference. The measurement beam, which is also decoupled from the optical fibre, exits the optical element and is lead to the surface of the object to be measured, where it is reflected by said surface and is lead back to a receiver. In the receiver (e.g. a Michelson-Interferometer or any other interferometric detector) the two signals are superimposed, wherein the delay of the measurement beam with regard to the reference beam allows to determine the distance to the reflecting surface with high accuracy. In one embodiment the interferometric measuring device is a laser interferometric measuring device.

Since the interferometric measurement is an optical path length measurement, the index of refraction is a parameter that is to be considered. The index of refraction for the lens forming material changes during the curing process. Therefore, any measurement during the curing process has to be corrected (or calibrated) taking into account said variability. To estimate the parameter (i.e. index of refraction) for calibration of the measurement, the distance of the mold halves in the final closed position is first measured when the mold cavity is filled with air, second when the mold cavity is filled with uncured lens forming material and third when the lens forming material is fully cured (i.e. the final lens). The data obtained is used to correct the optical path length measurement during the curing process.

The process and apparatus of the present invention is particularly useful in the manufacture of silicone hydrogel (SiHy) contact lenses, which are manufactured starting from a monomer or macromer lens forming material and wherein the shrinkage of the lens forming material upon curing is in the range of from 1 to 10%.

EXAMPLES

Figure 18:
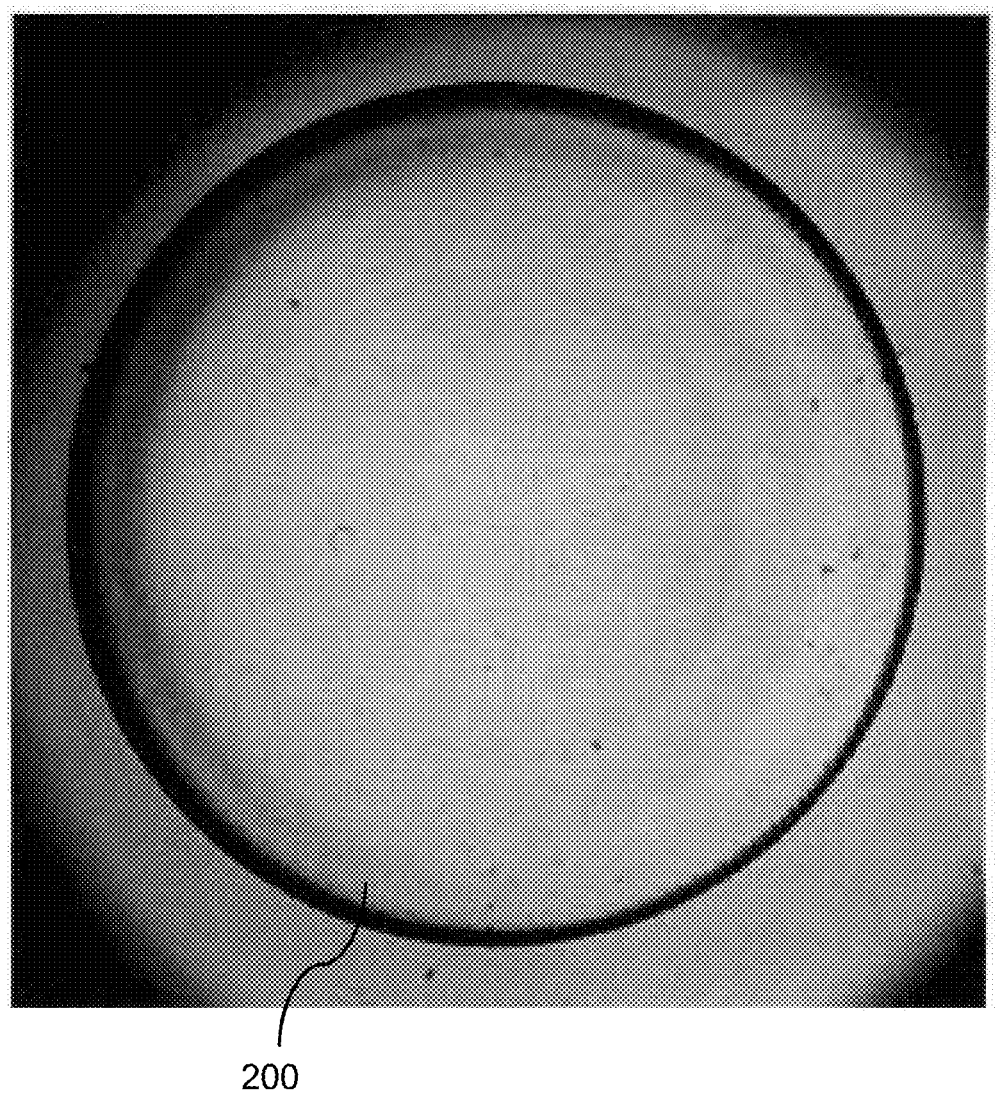
FIG. 18 is a bright field image of a silicone hydrogel contact lens manufactured according to the present invention.
Figure 19:
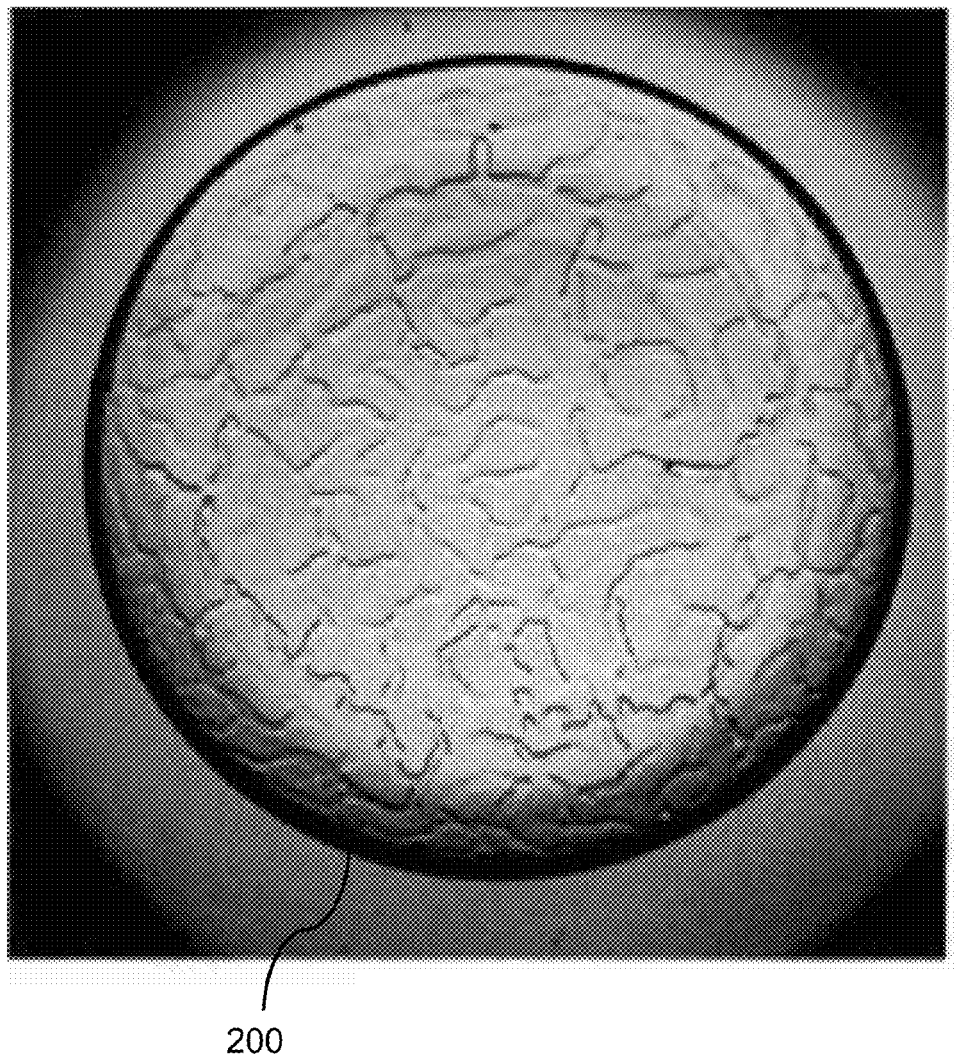
FIG. 19 is a bright field image of a silicone hydrogel contact lens with an uneven surface (i.e. showing "grooves" or "road maps")

An image of a silicone hydrogel contact lens with an uneven surface (i.e. showing "grooves", respectively "road maps") is shown in FIG. 19, whereas FIG. 18 is showing a silicone hydrogel contact lens of the same lens forming material, which has been manufactured according to the present invention. The lens of FIG. 18 has an even surface (i.e. showing no "grooves", respectively no "road maps").

The silicone hydrogel lens forming material used for the silicone hydrogel contact lens above is of the following composition:
33% CE-PDMS Macromer
17% Tris-acrylamide which is N-[tris(trimethylsiloxy)-silyl-propyl]acrylamide
24% N,N-dimethylacrylamide
0.5% L-PEG 200, which is (N-(Carbonyl-methoxypolyethylenglycol-200)-1,2-distearoyl-sn-glycero-3-phosphoethanolamine, sodium salt)
1.0% Darocur® 1173, a photoinitiator
24.5% 1-propanol CE-PDMS Macromer is a chain-extended polydimethylsiloxane vinylic macromer with terminal methacrylate groups and is prepared as below:

In the first step, α,ω-bis(2-hydroxyethoxypropyl)-polydimethylsiloxane (Mn=200, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=300, Shin-Etsu, KF-6002) and 50 g of dry methyl ethyl ketone are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxylgroups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Process for Manufacturing a Lens Using Passive Mold Closing

In a first step, about 40 microliters of the lens forming material prepared above is dispensed into the female mold half according to FIG. 11.

Spacer 112 (thickness: d5+d1, wherein d1 is about 10 μm) are placed onto the outer sleeve reference surface of the female mold half, the male mold is positioned by means of a centering case (single mold alignment) and lowered until the outer sleeve reference surfaces of male and female mold are both in contact with the spacer. Thus the male mold is positioned precisely above the female mold and the distance increase d1 between the inner sleeve reference surfaces of female and male mold is about 10 μm.

The closed mold with the clamped spacer between the outer sleeve reference surfaces is transported to an irradiation device. The spacer 112 are removed (according to FIG. 12) very carefully before crosslinking the lens material with UV radiation.

The contact lenses according to FIG. 18 is obtained by curing the closed mold for 15 to 120 seconds with a Hamamatsu lamp using an intensity of about 1 to 20 mW/cm$^2$ (as measured by measured by a UV sensor covering (or matching) the absorption characteristics (or spectrum) of the photoinitiator (such sensors are available from manufacturers such as ESE GmbH, Germany), and using an ion plated cut-off filter with 50% transmission at 328 nm made by Ing. Hans Tafelmaier Dünnschicht-Technik GmbH, Germany). During polymerization the shrinkage leads to stress in the contact lens and on the lens surface attached to the mold surfaces. This stress exerts a tractive force.

Comparative Example

In the process for a comparative example, the mold filled with lens forming material as above is completely closed without a spacer. The closed mold is then transported to an irradiation device and the lens material is crosslinked with UV irradiation as describe above.

Although the inventors do not wish to be bound by any particular theory, it is believed that, without providing a distance increase between the reference surfaces of the mold halves so that the mold halves can follow the shrinkage (i.e. with fully closed or fixed mold halves), the shrinkage of the polymerizing material results in a tractive force that (at least partly) detaches or delaminates the lens under formation from the mold surfaces. It is believed, that this erratic lens detachment or delamination forms the defects such as the meander like "grooves" or "roadmaps" in or on the lens surface (see FIG. 19).

However, with a distance increase of about 5 μm to about 15 μm between the reference surfaces of the mold halves, (i.e. with at least one moving mold half) it appears that the resulting tractive force draws the mold halves towards each other, so that the mold surfaces can follow the shrinkage of the polymerizing material. In particular, if the female mold half is fixed, the male mold half is passively moving towards the female mold half (i.e. passively closing the mold). The lens forming material stays attached to the (moving) mold surface at all time and an even lens surface is formed (see FIG. 18).

The invention claimed is:

1. A process for manufacturing an ophthalmic lens, comprising the steps of
    providing a mold assembly comprising a first mold half having a first molding surface and a second mold half having a second molding surface in an open position;
    dosing a lens forming material into the first mold half;
    closing the first and second mold halves to form a mold cavity defining the shape of the ophthalmic lens;
    curing the lens forming material in the mold cavity;
    opening the first and a second mold halves;
    removing the lens from the first or second mold half;
and wherein (i) the step of closing the first and second mold halves comprises moving the first and second mold halves to an intermediate closed position, wherein the first and second molding surfaces of the first and second mold halves are arranged at an intermediate distance increase (d1) relative to a final distance (d0) in a final closed position; and
(ii) during curing of the lens forming material moving the mold halves to the final closed position, wherein the intermediate distance increase (d1) is 0; and then re-opening the mold halves to the intermediate closed position wherein the first and second molding surfaces of the first and second mold halves are arranged at a distance increase (d1) relative to the final distance (d0) in the final closed position.

2. The process according to claim 1, wherein the step of re-opening comprises the following steps:
    locking the first mold half in the final closed position;
    positioning a means for re-opening at the back surface of the second mold half, at a reference surface of the second mold half, or between two reference surfaces of the first and second mold halves;
    locking the means for re-opening in a re-opening position;
    actuating the means for re-opening to move the second mold half to a position such that the first and second mold halves are in the intermediate closed position.

3. The process according to claim 1, wherein during curing of the lens forming material the mold halves are actively moved to the final closed position by actuating a closing means.

4. The process according to claim 3, wherein the first mold half and/or the second mold half is continuously moved to a position such that the first and second mold halves are in the final closed position during the curing period of the lens forming material at a speed of from 0.1 μm/s to 5 μm/s.

5. The process according to claim 1, further comprising the step of measuring the distance increase (d1) during curing of the lens forming material with an interferometric measuring device, and by using the measured distance for controlling the relative movement of the first and second mold halves in accordance with the characteristics of the curing process for the said lens forming material.

6. The process according to claim 1, wherein the first and second mold halves are aligned and centered by means for aligning and/or centering the two mold halves in relation to each other.

* * * * *